US006994764B2

(12) United States Patent
Rathgeb

(10) Patent No.: US 6,994,764 B2
(45) Date of Patent: Feb. 7, 2006

(54) METHOD FOR PRODUCING A SHAPED PART

(75) Inventor: Erich Rathgeb, Aalen (DE)

(73) Assignee: Munksjoe Paper Decor GmbH & Co. KG, (DE)

( * ) Notice: Subject to any disclaimer, the term of this patent is extended or adjusted under 35 U.S.C. 154(b) by 288 days.

(21) Appl. No.: 10/130,489

(22) PCT Filed: Oct. 13, 2001

(86) PCT No.: PCT/DE01/03934

§ 371 (c)(1),
(2), (4) Date: May 16, 2002

(87) PCT Pub. No.: WO02/38345

PCT Pub. Date: May 16, 2002

(65) Prior Publication Data

US 2004/0112515 A1 Jun. 17, 2004

(30) Foreign Application Priority Data

Nov. 10, 2000 (DE) .......................... 200 19 180 U

(51) Int. Cl.
*B32B 1/00* (2006.01)

(52) U.S. Cl. .................................... 156/212; 156/307.7

(58) Field of Classification Search ................ 156/622, 156/307.4, 212, 222, 214, 307.7; 264/118; 162/95

See application file for complete search history.

(56) References Cited

U.S. PATENT DOCUMENTS

| | | | | | |
|---|---|---|---|---|---|
| 3,372,084 | A | * | 3/1968 | Arledter | 162/128 |
| 3,382,124 | A | * | 5/1968 | Briskey | 156/202 |
| 3,514,353 | A | | 5/1970 | Shaines | |
| 3,793,125 | A | * | 2/1974 | Kunz | 156/62.2 |
| 4,045,262 | A | | 8/1977 | Enzinger et al. | |
| 4,131,664 | A | * | 12/1978 | Flowers et al. | 264/510 |
| RE30,233 | E | * | 3/1980 | Lane et al. | 156/277 |
| 4,405,690 | A | * | 9/1983 | Brooker et al. | 428/503 |
| 4,412,883 | A | * | 11/1983 | Rizo' | 156/222 |
| 4,654,259 | A | * | 3/1987 | Stofko | 428/326 |
| 4,865,807 | A | * | 9/1989 | Petershofer et al. | 428/161 |
| 6,110,313 | A | * | 8/2000 | Ford | 156/212 |

FOREIGN PATENT DOCUMENTS

| | | |
|---|---|---|
| DE | 2002918 | 7/1970 |
| DE | 2426518 | 12/1975 |

* cited by examiner

*Primary Examiner*—Blaine Copenheaver
*Assistant Examiner*—Barbara J. Musser
(74) *Attorney, Agent, or Firm*—Galgano & Burke, LLP

(57) ABSTRACT

To make a shaped article, a decorative paper whose cotton linters content is at least 10 wt % and can be as high as 100 wt % of the total fiber content in the paper is impregnated with a cross-linkable aminoplastic resin, applied on a carrier of wood-based material and formed to a three-dimensional structure under pressure and at elevated temperature while the resin undergoes cross-linking.

14 Claims, No Drawings

METHOD FOR PRODUCING A SHAPED PART

DESCRIPTION

The invention relates to a method for making a shaped article.

The object of the invention is to provide a method for making a shaped article with a thermoset plastic surface having three-dimensional structure, especially for furniture and components of wood and wood-based materials.

In the method that achieves this object, a decorative paper whose cotton linters content is at least 10 wt % and can be as high as 100 wt % of the total fiber content in the paper is impregnated with a cross-linkable aminoplastic resin, applied on a carrier of wood-based material and formed to a three-dimensional structure under pressure and at elevated temperature while the resin undergoes cross-linking.

Forming is preferably achieved by pressing.

The cotton linters are obtained from lint of natural origin, which can be processed in suitable manner.

Decorative paper is usually manufactured on the basis of cellulosic material as the only fibrous material. According to the teaching of the invention, the cellulosic material can be replaced entirely or partly by cotton linters, so that the fiber content of the paper is composed of cotton linters or a mixture of cotton linters and cellulosic material.

Cellulosic material is almost pure cellulose. The mixture of cotton linters and cellulosic material is therefore substantially a mixture of cotton linters and cellulose.

Cotton linters can be processed alone or together with cellulosic material on a papermaking machine in exactly the same way as pure cellulosic material. It is self-evident that the decorative paper used according to the invention can contain not only the fibrous material but also the other usual constituents of a decorative paper, such as fillers and pigments.

Paper containing cotton linters as fiber constituent is known for other applications. In U.S. Pat. No. 5,089,327 A, for example, paper with a cotton linters content of 8% to 16% is impregnated in a size press until saturated with a polymer acting as an antistatic agent. The web obtained is further processed to a multi-layer high-pressure laminate. The laminate is a flat product. Three-dimensional forming is not applied.

U.S. Pat. No. 4,061,823 A relates to a high-pressure laminate whose core layers comprise cotton linters in paper form and contain cured phenol resin. This laminate is also a flat product and not a three-dimensional shaped article.

In a preferred alternative embodiment, carrier and decorative paper are formed together. This is preferably achieved by pressing in a stamping (in-mold) press.

In another preferred alternative embodiment, a carrier having a three-dimensional surface contour is used and the decorative paper is formed to match this contour. This is preferably achieved by pressing in a membrane press.

Preferably there is used a decorative paper whose fiber content is composed of cotton linters and cellulosic material. The content of cotton linters should be 10 to 80 wt %, preferably 20 to 80 wt % of the total fiber content in the paper.

The decorative paper used according to the invention has a weight of 40 to 200 $g/m^2$. It is a voluminous paper of high absorbency, flexibility and tearing strength. The large volume and high absorbency of the paper ensure maximum resin uptake during the impregnation process.

The paper can be printed. Gravure or screen printing is possible for articles made in large series, preferably with the water-based printing-ink system that is customary for decorative printing. Digital printing is conceivable for small series and special products.

In a preferred alternative embodiment there is used a decorative paper with a surface application of a buffer system that controls the curing reaction of aminoplastic resin. The buffer system is applied onto the decorative paper with a suitable applicator machine, such as a size press.

In another preferred alternative embodiment, there is used a decorative paper with incorporation into the pulp of a buffer system that controls the curing reaction of aminoplastic resin. The buffer system is incorporated into the pulp, which is eventually processed on the papermaking machine.

In a preferred alternative embodiment, a wood-fiber mat, wood-based chipboard or wood-based fiberboard, especially hard fiberboard, medium-density fiberboard or high-density fiberboard is used as the carrier.

In a preferred alternative embodiment, the decorative paper is applied in one layer on the carrier.

The invention will be explained in more detail hereinafter on the basis of examples.

EXAMPLE 1

Decorative paper with a high fiber content of cotton linters is impregnated with an aminoplastic resin. Thereafter the paper is dried and applied on a carrier of wood-based material, such as a wood-fiber mat, hard fiberboard, medium-density fiberboard or high-density fiberboard.

Carrier and paper are formed to a three-dimensional structure in a stamping (in-mold) press. Three-dimensional forming is to be understood as forming in length, width and height.

The stamping press has embossing dies in the form of a male die and a female die, between which carrier and paper are pressed together. The male and female dies have a complementary surface contour, which represents a perfect negative of the pressed article. In this type of press the carrier is coformed.

The carrier and the decorative paper impregnated with aminoplastic resin are exposed together to a pressure of more than 100 bar (10 MPa) and a temperature of 100° C. to 140° C. and pressed for a duration of 1 to 5 minutes in 1 step. At the same time the aminoplastic resin undergoes cross-linking and the entire structure is molded.

The resin can contain suitable catalysts (hardeners) for the process of cross-linking and curing.

After the pressing process, a blank with a thermoset (heat-cured) plastic surface layer is obtained. The blank can be further processed in the furniture industry to a thermoset plastic furniture surface.

Compared with conventional thermoplastic furniture surfaces, the inventive thermoset plastic furniture surface is characterized by better scratch resistance, heat resistance, bonding to the carrier material, fastness to light, resistance to chemicals and suitability for recycling.

EXAMPLE 2

A carrier with a predetermined three-dimensional surface contour is used. An appropriately premilled medium-density fiberboard is cited as an example.

The decorative paper impregnated with aminoplastic resin is applied on the carrier and introduced together therewith into the pressure-tight pressing chamber of a membrane press. The pressing chamber is outgassed by application of a vacuum. Using a membrane preheated to 100° C. to 120° C., the carrier and decorative paper are then pressed together in one working cycle at a pressure of 5 to 18 bar (0.5 to 1.8 MPa). The pressure is applied by compressed air or heated oil. The duration of the pressing process is about 1 to 5 minutes.

In the membrane press, only the impregnated decorative paper is formed. It conforms to the predetermined surface contour of the carrier and forms thereon a thermoset (heat-cured) plastic surface layer. In this type of press the carrier is not conformed.

RESULT

The decorative paper used withstands the loads imposed during stamping pressing and membrane pressing with simultaneous forming of the paper and curing of the aminoplastic resin. No cracking occurs. The critical factor in this process is that cotton linters account for at least 10 wt % of the fiber content of the paper. As a result, a thermoset plastic surface layer formed with three-dimensional structure is obtained for the first time by pressing a decorative paper.

What is claimed is:

1. A method for making a shaped article comprising the steps of:

a) impregnating a decorative paper whose cotton linters content is in the range of at least 10% by weight of the total fiber content in the paper with a cross-linkable aminoplastic resin;

b) applying said decorative paper to a carrier of wood-based material which has a three-dimensional surface contour; and c) subjecting said carrier and decorative paper to pressure and an elevated temperature while the resin undergoes cross-linking and forming the decorative paper to match the contour of the carrier, thus making in one step a three-dimensional structure, wherein said cross-linking of said resin occurs only in step c).

2. A method according to claim 1, wherein said forming step of subjecting said carrier and decorative paper to pressure is achieved by pressing.

3. A method according to claim 2, wherein said pressing is performed in a stamping press.

4. A method according to claim 1, wherein said decorative paper is a decorative paper whose fiber content is composed of cotton linters and cellulosic material.

5. A method according to claim 1, wherein said decorative paper is a decorative paper whose content of cotton linters is in the range of 10 to 80% by weight of the total fiber content in the paper.

6. A method according to claim 1, wherein said decorative paper is a printable decorative paper.

7. A method according to claim 1, wherein said decorative paper is a decorative paper with a surface application of a buffer system that controls the curing reaction of aminoplastic resin.

8. A method according to claim 1, wherein said decorative paper is a decorative paper having pulp incorporated with a buffer system that controls the curing reaction of aminoplastic resin.

9. A method according to claim 1, wherein said carrier comprises a member selected from the group consisting of a wood-fiber mat, wood-based chipboard and wood-based fiberboard.

10. A method according to claim 1, wherein said decorative paper is applied in one layer on said carrier.

11. A method according to claim 2, wherein said pressing is performed in a membrane press.

12. A method according to claim 5, wherein said content of cotton linters is 20 to 80% by weight of the total fiber content in the paper.

13. A method according to claim 9, wherein said carrier is selected from the group consisting of hard fiberboard, medium density fiberboard, and high density fiber board.

14. A method according to claim 1, wherein said decorative paper is a decorative paper whose fiber content is solely cotton linters.

* * * * *